US010075700B2

(12) United States Patent
Blonde et al.

(10) Patent No.: US 10,075,700 B2
(45) Date of Patent: Sep. 11, 2018

(54) DEVICE, METHOD AND COMPUTER PROGRAM FOR 3D RENDERING

(71) Applicant: THOMSON LICENSING, Issy de Moulineaux (FR)

(72) Inventors: Laurent Blonde, Thorigne-Fouillard (FR); Cyril Vienne, Cesson Sevigne (FR); Thai-Quan Huynh-Thu, Woollahra (AU)

(73) Assignee: Thomson Licensing, Issy les Moulineaux (FR)

( * ) Notice: Subject to any disclaimer, the term of this patent is extended or adjusted under 35 U.S.C. 154(b) by 234 days.

(21) Appl. No.: 14/862,279

(22) Filed: Sep. 23, 2015

(65) Prior Publication Data
US 2016/0191888 A1    Jun. 30, 2016

(30) Foreign Application Priority Data

Sep. 24, 2014    (EP) .................................. 14306472

(51) Int. Cl.
*H04N 13/00* (2018.01)
*G06T 15/00* (2011.01)
*H04N 13/128* (2018.01)
*H04N 13/383* (2018.01)
(Continued)

(52) U.S. Cl.
CPC ............. *H04N 13/128* (2018.05); *G06T 3/40* (2013.01); *G06T 15/00* (2013.01); *H04N 13/0022* (2013.01); *H04N 13/0484* (2013.01); *H04N 13/383* (2018.05)

(58) Field of Classification Search
CPC .............................. H04N 13/00; H04N 13/04
See application file for complete search history.

(56) References Cited

U.S. PATENT DOCUMENTS

| 6,462,769 B1 | 10/2002 | Trowbridge et al. |
| 2010/0045783 A1 | 2/2010 | State et al. |
| 2011/0228051 A1 | 9/2011 | Dedeoglu |
(Continued)

FOREIGN PATENT DOCUMENTS

| KR | 100952045 | 4/2010 |
| KR | 101164915 | 7/2012 |
| WO | WO2013156333 | 10/2013 |

OTHER PUBLICATIONS

Fleet et al., "Computer Graphics Lecture Notes", Computer Science Department, University of Toronto, Nov. 24, 2006, pp. 1-126.
(Continued)

*Primary Examiner* — Sathyanaraya V Perungavoor
*Assistant Examiner* — Patricia I Young
(74) *Attorney, Agent, or Firm* — Tutunjian & Bitetto, P.C.

(57) ABSTRACT

The present disclosure improves 3D representation (by means of adjusting disparity between pictures) in stereoscopic or autostereoscopic images in order to better fit the natural viewing geometry by modifying each image of a stereo pair with a geometric transform centered on an intersection point of an imaging plane and a gaze direction for each of eyes. An observer's view is modeled independently for the left and right eyes, and the left and right views are processed independently with the goal to re-align pixel directions for each of eyes to make these directions more in correspondence with natural vision for the observer.

12 Claims, 7 Drawing Sheets

(51) Int. Cl.
H04N 13/04 (2006.01)
G06T 3/40 (2006.01)

(56) References Cited

U.S. PATENT DOCUMENTS

2012/0140027 A1\* 6/2012 Curtis ................ H04N 13/026
348/43
2014/0285641 A1\* 9/2014 Kato ....................... G06F 3/013
348/54

OTHER PUBLICATIONS

Dodgson, "Variation and extrema of human interpupillary distance", Proceedings of SPIE, vol. 5291, Stereoscopic Displays and Virtual Reality Systems XI, San Jose, California, USA, Jan. 19, 2004, pp. 36-46.

Rosenberg, "The effect of Interocular Distance Upon Operator Performance Using Stereoscopic Displays to Perform Virtual Depth Tasks", 1993 IEEE Virtual Reality Annual International Symposium, Seattle, Washington, USA, Sep. 18, 1993, pp. 27-32.

Huynh-Thu et al., "The importance of Visual Attention in Improving the 3D-TV Viewing Experience: Overview and New Perspectives", IEEE Transactions on Broadcasting, vol. 57, No. 2, Jun. 2011, pp. 421-430.

Vaissie et al., "Analysis of Eyepoint Locations and Accuracy of Rendered Depth in Binocular Head-mounted Displays", IS&T/SPIE Conference on Stereoscopic Displays and Applications X, Proceedings of SPIE vol. 3639, San Jose, California, USA, Jan. 1999, pp. 57-64.

Johnston, "Systematic Distortions of Shape From Stereopsis", Vision Research, vol. 31, No. 7/8, 1991, pp. 1351-1360.

Vienne et al., "Perception of Stereo At Different Vergence Distance: Implications for Realism", International Conference on 3D Imaging, Dec. 3, 2012, pp. 1-8.

Alonso et al., "Ophthalmic Optics", Encyclopedia of Optical Engineering, Marcel Dekker Inc, New York, 2003, pp. 1563-1576.

Murray et al., "The representation of perceived angular size in human primary visual cortex", Nature Neuroscience, vol. 9, No. 3, Mar. 2006, pp. 429-434.

Watt et al., "Focus cues affect perceived depth", Journal of Vision, vol. 5, No. 10, 2005, pp. 834-862.

Mon-Williams et al., "Ordinal Depth Information From Accommodation", Ergonomics, vol. 43, No. 3, 2000, pp. 391-404.

Rogers et al., "Disparity Scaling and the Perception of Frontparallel Surfaces", Perception, vol. 24, 1995, pp. 155-179.

Howard et al., Binocular Vision and Stereopsis, Book Reviews, TINS, vol. 19, No. 9, 1996, pp. 407-408.

Son et al., "Distortion analysis in stereoscopic images", Optical Engineering, vol. 41, No. 3, Mar. 2002, pp. 680-685.

Viale et al., "Analysis of scene distortions in stereoscopic images, due to the variation of the ideal viewing conditions", Proceedings of the SPIE—IS&T Electronic Imaging, SPIE vol. 7863, 2011, pp. 1-8.

Kim et al., "Analysis and Compensation of Distorted Stereoscopic Images Due to the Observers Viewing Orientation", Optics Communications, vol. 285, No. 19, 2012, pp. 3909-3916.

Said et al., "Virtual object distortions in 3D displays with only horizontal parallax", 2011 IEEE International Conference on Multimedia and Expo, Barcelona, Spain, Jul. 11, 2011, pp. 1-6.

Holliman, "Mapping Perceived Depth to Regions of Interest in Sereoscopic Images", IS&T/SPIE Conference on Stereoscopic Displays and Applications XV, Proceedings of SPIE vol. 5291, San Jose, California, USA, Jan. 2004, pp. 1-12.

\* cited by examiner

DEVICE, METHOD AND COMPUTER PROGRAM FOR 3D RENDERING

FIELD

The present disclosure generally relates to a device, a method and a computer program for 3D rendering.

BACKGROUND 3D rendering is usable in various fields such as a 3DTV, 3D displays, 3D games, 3D glasses, and so forth.

Virtual Reality/augmented reality are particularly facing the issue of correspondence between the real and the virtual world and can benefit from the embodiment of the present disclosure as well.

The embodiment of the present disclosure improves 3D representation (by means of adjusting disparity between pictures) in stereoscopic or autostereoscopic images in order to better fit the natural viewing geometry.

Classically, for rendering, pinhole camera models are used which are not in accordance with the way human eyes capture and exploit angles in space for depth perception.

According to the present embodiment, a new model is used taking into account individual characteristics to modify the projective geometry.

Today, the prevalent 3D content creation model is the double perspective projection (or double pinhole camera model). It is widely used for both synthetic and natural content, either as a GCI camera model, or as a representation model for real cameras. It is used as well as basis for 3D image processing of many sorts.

Figure 1:
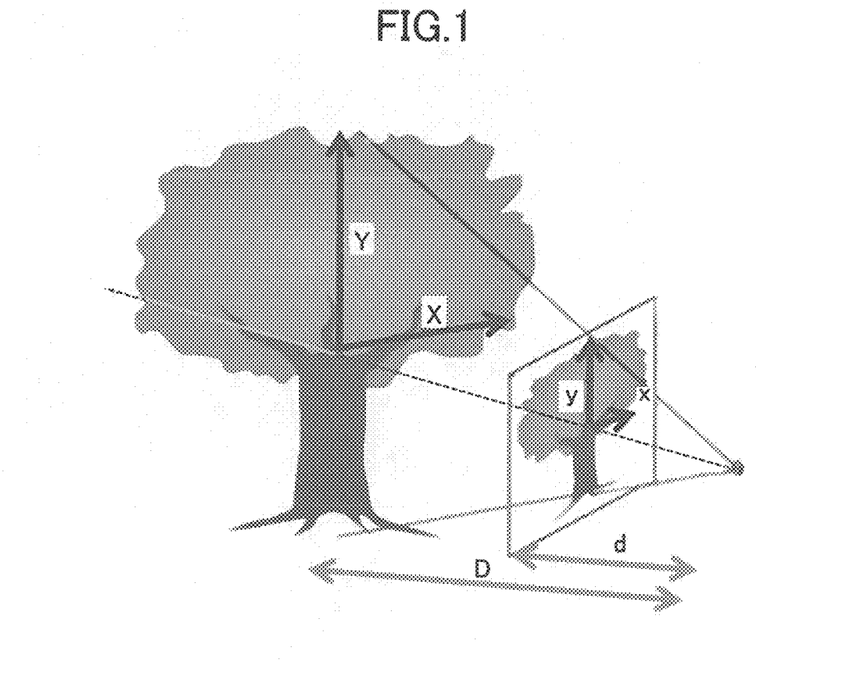
FIG. 1 illustrates perspective projection.

As shown in FIG. 1, perspective projection predicts $x/d=X/D$ and $y/d=Y/D$ for each of the two eyes.

Binocular observation is classically modeled by a double perspective projection, one corresponding to each eye or camera directed perpendicularly to the eye plane.

Figure 2:
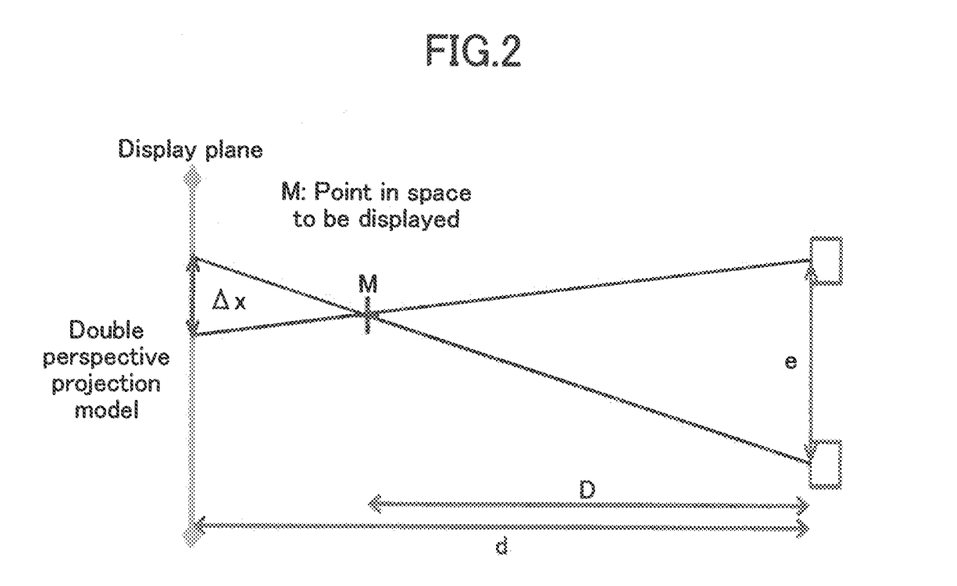
FIG. 2 illustrates disparity computed from double perspective projection.

With this model, as shown in FIG. 2, the disparity $\Delta x$ between views for a point to be shown at a distance D and for a display at a distance d is predicted to be $$\Delta x = (e \cdot d)/D \qquad (1)$$

where "e" is the interocular (or inter-pupillary) distance.

Today this basic pinhole camera model is widely used to design cameras, in 3D computed generated imagery (CGI) or for 3D images or video processing. This generates 3D images and video with scale/depth distortion or incorrect 3D perspective and motion distortion when compared to human vision.

Compared to natural viewing, the pinhole camera model creates images more difficult to visualize, although they are accepted as 3D images by the human visual system. That is, the correspondence with the natural space is only partial, valid only for small visual angles around the attention point.

Some solutions have been proposed to attenuate the annoyance (depth scaling/image scaling) such as a solution previously proposed by the applicant giving control of depth strength to the user, or as in the following paper:

"Mapping perceived depth to regions of interest in stereoscopic images", N. S. Holliman, in Stereoscopic Displays and Virtual Reality Systems XI, Proceedings of SPIE-IS&T Electronic Imaging, SPIE Vol. 5291, 2004" (see http://www.dur.ac.uk/n.s.holliman/Presentations/E15291A-12.pdf)

The objective of the present embodiment is to improve a projection model in order to obtain a better 3D representation and rendering for a better spatial matching between an intended (designed or captured) space and its representation on a 3D display. As a result, the 3D rendered objects will appear more natural to the observers.

According to the present disclosure, an observer's view is modeled independently for the left and right eyes, and the left and right views are processed independently with the goal to re-align pixel directions for each of eyes to make these directions more in correspondence with natural vision for the observer.

SUMMARY

According to one aspect of the present disclosure, each image of a stereo pair is modified with a geometric transform centered on an intersection point of an imaging plane (screen plane where the right and left image are displayed) and a gaze direction for each of eyes.

Other objects, features and advantages of the present disclosure will become more apparent from the following detailed description when read in conjunction with the accompanying drawings.

DESCRIPTION OF EMBODIMENT

A preferred embodiment of the present disclosure will be described with reference to the accompanying drawings.

The embodiment of the present disclosure is applicable to various fields such as a 3DTV, 3D displays, 3D games, 3D glasses, and so forth, and relates to enhancement of user experience with a better representation of 3D scenes improving depth perception. It deals with image rendering/adaptation aspects.

As described above, according to the present embodiment, an observer's view is modeled independently for the left and right eyes, and the left and right views are processed independently with the goal to re-align pixel directions for each of eyes to make these directions more in correspondence with natural vision for the observer.

The realignment is applied on 'standard' 3D observer images or on computer graphics camera models i.e. the input images were rendered or acquire with algorithms or camera models working with a double perspective projection (double pinhole camera model).

As will be described later with the flowchart of FIG. 3, after a first step, the disparity for the fixation point is adjusted to be at the intended distance (Step S3 in FIG. 3). Then, each view (left and right) is independently processed correcting first a potential keystoning (and astigmatism) (Step S6) before applying a radial transform (Step S7).

Basically, the radial transform is a central scaling (centered on the visual axis) while higher order coefficients would represent optical distortions.

Then, inverse keystoning re-projects back the transformed image in the screen plane (Step S8).

Processes of keystoning, radial transform and inverse keystoning (Steps S6-S8) can be combined in a single image processing step.

By the present embodiment, advantages can be expected such as a better immersion for the observer in a 3D scene (realness), a better correspondence between an intended (designed or real) space and its representation on a 3D display and a better quality of experience for the observer due to an enhanced perceived naturalness of the content.

According to the present embodiment, stereo pair views are modified with geometric transforms centered on the point of fixation and depending on parameters determined for a given observer.

The point of fixation will follow an actual eye gaze (given by eye tracking) or follow a predicted eye gaze (content based processing) as in the following paper:

"A coherent computational approach to model bottom-up visual attention.", Le Meur, Olivier, Patrick Le Callet, Dominique Barba, and Dominique Thoreau, in Pattern Analysis and Machine Intelligence, IEEE Transactions on 28, no. 5 (2006): 802-817.

The parameters are determined by an interactive test procedure or the parameters are determined by an adaptive process along with visualization.

The specific configuration of the embodiment will now be described in detail with reference to the drawings.

The physiological parameters of human vision will be described later on which is based the following model of the embodiment.

[Transform to be Applied on Images]

According to the embodiment, a spatial (angular domain) transform is applied to 3D presented content, dependent on the fixation point and centered on the visual axes, in order to take into account the various optical and non-optical effects in human vision with the goal to enlarge the field of fused 3D.

Figure 3:
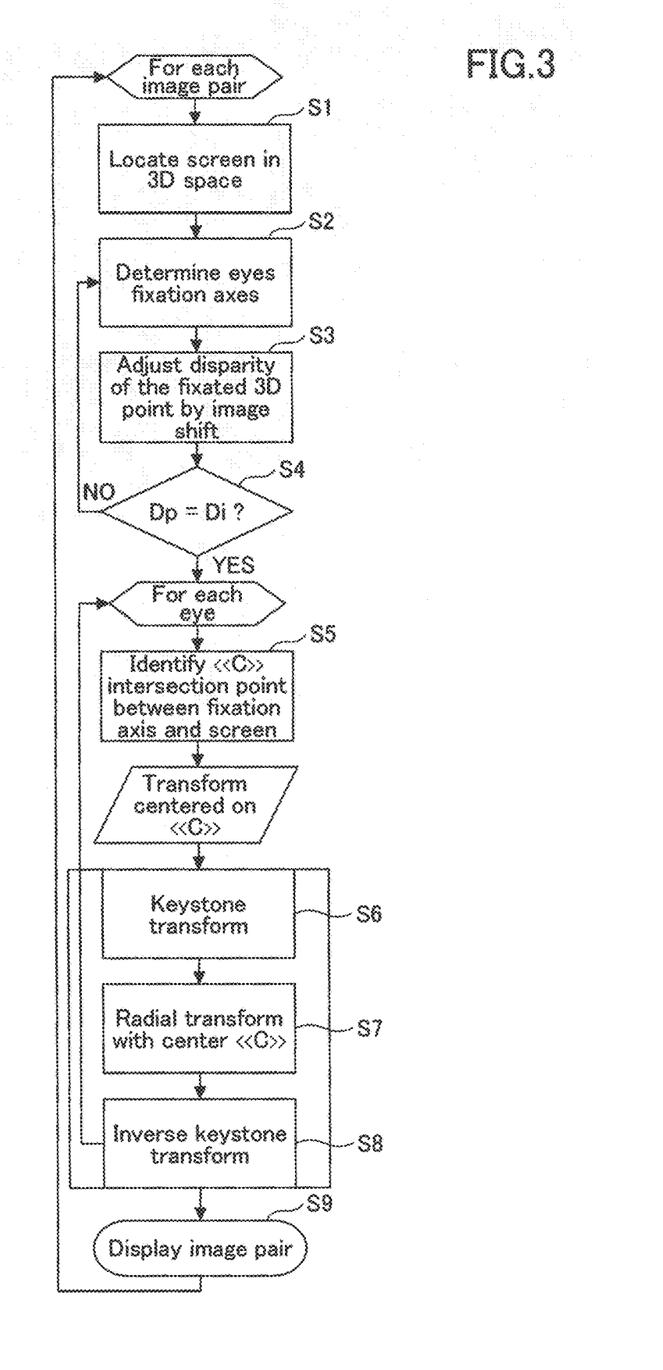
FIG. 3 is a flowchart illustrating a 3D rendering process according to an embodiment of the present disclosure.

FIG. 3 is a flowchart of a 3D rendering process according to the model of the present disclosure embodiment.

Steps S1-S9 are executed for each image pair.

In Step 51, a screen is located in 3D space. That is, a rectangle is located in 3D space where the left and right views are displayed.

In Step S2, the eyes fixation axes are determined. That is, either by eye tracking or by 3D attention modeling, the eyes fixation axes are determined. This determination takes into account the potential optical deviation of prescription glasses.

In Step S3, the disparity of the fixated 3D point is adjusted by image shift so that the fixated 3D point perceived distance Dp corresponds to the intended distance Di.

In Step S4, when Dp becomes equal to Di in Step 3 (YES), Steps S5-S8 is executed.

When Dp does not become equal to Di (NO), Steps S2-S3 are repeated until Dp becomes equal to Di (YES in Step S4).

Steps S5-S8 are executed for each of eyes.

In Step S5, the intersection point <<C>> between the fixation axis and the imaging plane is identified.

In Steps S6-S8, the transform process is carried out centered on the intersection point <<C>>. As mentioned above, the three steps S6-S8 can be combined in a single image processing function.

In Step S6, the keystone transform process is carried out. Note that, in case of convergence or lateral viewing, the keystone transform process works in a plane orthogonal to the fixation axis (this transform may account for potential astigmatism).

In Step S7, the radial transform process is carried out with the center <<C>>. As mentioned above, the first order is a central scaling (e.g., linked to accommodation) and the higher orders represent optical distortions.

In Step S8, the inverse keystone process is carried out to re-project back the transformed image in the imaging plane.

In Step S9, the thus acquired image pairs are actually displayed.

The process of FIG. 3 starts from the identification that 3D perception is based first on monocular retinal images. For each individual observer, binocular fusion is trained/adapted to his/her daily life environment. The left and right monocular images, in order to be fused comfortably to create a 3D percept, have to respect, or be closer to, the geometry of natural life observation, for both still scenes and scenes in motion.

The process of FIG. 3 has the goal to transform stereoscopic views initially created for a 'standard' 3D observer as mentioned above.

[Transform to be Applied on 3D Graphics Cameras]

Another model, based on the same principles, can be derived for a CGI pipeline in the form of a transformed camera model.

In this regard, a classical camera model as defined in OpenGL language has the following form:

This is an excerpt from: "http://www.dgp.toronto.edu/~hertzman/418notes.pdf" (Copyright c 2005 David Fleet and Aaron Hertzmann).

"§ 6.10 Camera Projections in OpenGL

OpenGL's modelview matrix is used to transform a point from object or world space to camera space. In addition to this, a projection matrix is provided to perform the homogeneous perspective transformation from camera coordinates to clip coordinates before performing perspective division. After selecting the projection matrix, the glFrustum function is used to specify a viewing volume, assuming the camera is at the origin:

glMatrixMode (GL_PROJECTION);
glLoadIdentity( );
glFrustum (left, right, bottom, top, near, far);
For orthographic projection, glOrtho can be used instead:
glOrtho (left, right, bottom, top, near, far);
The GLU library provides a function to simplify specifying a perspective projection viewing frustum:
gluPerspective (fieldOfView, aspectRatio, near, far);
The field of view is specified in degrees about the x-axis, so it gives the vertical visible angle. The aspect ratio should usually be the viewport width over its height, to determine the horizontal field of view."

To realize a transform according to the present embodiment, the glFrustum is used with the adequate scaling applied on the fieldOfView parameter of the gluPerspective( ) function. This scaling will realize the first order of the radial function centered on "C".

Higher order distortions have to be realized as warping on the resultant image of this modified camera model, for each view.

Figure 4:
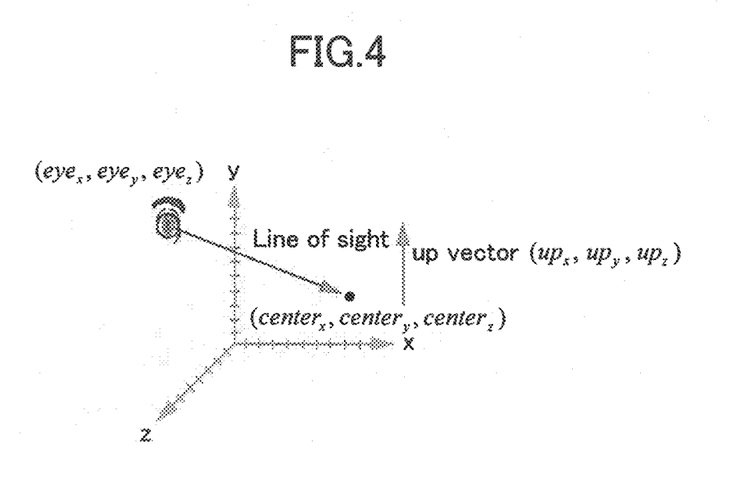
FIG. 4 illustrates an OpenGL function gluLookAt( ) used to define left and right positions and orientations in a classical camera model.

Stereoscopic acquisition is realized by a function with the camera axes oriented towards the attention point in the 3D CGI scene. The OpenGL function gluLookAt( ) can be used to define the left and right eye position and orientation.

gluLookAt(eye$_x$, eye$_y$, eye$_z$, center$_x$, center$_y$, center$_z$, up$_x$, up$_y$, up$_z$) (see FIG. 4)

The function gluLookAt creates a viewing matrix that allows defining the camera position and to look at a specific point in the scene. [Test to derive the transform parameters]

The transform according to the present embodiment requires the parameters measured or estimated for a given observer, one by one, as follows. An absolute coordinate system is supposed known with the origin O and the axes Ox, Oy and Oz.

Screen:

The screen absolute position is defined in space, for example, by the geometric coordinates of three corners of the light emitting surface. Conversion from the space coordinates to pixels is supposed known on the light emitting surface.

Eyes Position:

The coordinates of the center of rotation of the left and the right eyes of an observer are supposed known either from an assumed head position and interocular distance or from an eye tracking measurement.

Fixation Axes:

The fixation axes are defined by two points in space for each of the left and right ocular geometries, i.e., an eye side point and a scene side point.

Eye Side Point:

Either the center of rotation of the eye, or a point derived from the center of rotation knows or assumes the eye structure and geometry. Such a derived point can be the center of the eye pupil, the eye nodal point, the fovea or foveola, etc.

Scene Side Point:

A measurement or an estimate of the fixation point in space for each of eyes is potentially not the same point for both eyes in case of squint (strabismus) for example. The measurement can be performed using a gaze tracking system. If a measurement is not available, an estimate can be obtained predicting the region of interest by analyzing the content presented to the observer.

The fixation axes are two lines in space potentially crossing on the fixation point, corresponding to a specific area of interest of the content displayed on the screen.

Potentially, depending of the observer, these two fixation axes (left eye and right eye) do not cross at all, or do not cross at the intended distance from the observer (according to content design).

Image Shifts:

A physical object is used (e.g. the corner of a diamond shaped card), placed at the intended fixation point in space at a known distance (an acquisition device like a webcam, a kinect, an ultrasound or a time of flight system may help determining the physical distance of the physical object and of the observer's face from the screen plane) from the observer's eye plane. Simultaneously, the intended fixation point is rendered on the screen, potentially surrounded with static or dynamic image structures stabilizing the observer's gaze. If these two lines do not cross at this point, the content images are translated (pixel shifted) one relative to the other, horizontally and potentially vertically, for the perceived fixation point to match the intended fixation point in terms of distance and eccentricity.

This shifting process may be done iteratively, reevaluating the fixation axes after each shift step.

In case of significant occlusions, a more complex processing may be necessary than image shifting, based on view re-interpolation depending on local disparities.

For Each of Eyes, Keeping Fixation

Transform Center "C"

The transform center "C" is determined as the intersection of the fixation axis and the imaging plane for the eye under consideration.

Keystone Transform

A plane Pk in space is determined as passing through the fixation point and being perpendicular to the fixation axis for the eye under consideration.

The keystone transform is realized as the projection in space of the image content pixels towards the eye side point and onto the plane Pk (potentially approximated by an orthogonal projection on the plane Pk).

Scale Factor and Distortion:

A physical object is used (e.g. a diamond shaped card) placed with one corner at the intended fixation point now adjusted. Simultaneously the same shape as the physical object is rendered on the screen.

The size of the shape is adjusted interactively by the observer using a scaling transformation centered on the fixation point. This is equivalent to a radial scaling with a function r'=s·r, r and r' being the radial distances to the fixation point in the Pk plane.

The observer may observe the stimuli binocularly or chose to close the eye not under consideration to realize the scaling adjustment.

Distortion can be estimated by matching points at different radial distances on the physical object with points on the rendered shape. The function in this case can be a higher order polynomial of the form:

$$r'=s_1 \cdot r + s_2 \cdot r^2 + s_3 \cdot r^3 \ldots$$

In case of anisometropia or if the person observes the screen from a side, the scaling factor of the polynomial coefficients may be found different from one or the other eye.

Anisotropic distortion can as well be estimated in case of astigmatism. Comparing the physical object and the rendered shape, a horizontal and a vertical scaling will be performed.

Dynamic Aspect:

As the parameters vary depending on the fixation point distance and eccentricity (as depending on glasses prismatic deviation, convergence, accommodation or pupil size), the parameters have to be estimated for several fixation point positions in space, an interpolation providing these parameters for intermediate positions.

Resulting from the tests and from the interpolation based on the fixation distance and eccentricity, the 3D model parameters according to the present embodiment are available for all the fixation positions in a volume facing the observer.

As mentioned above, the present embodiment is applicable to 3DTV, 3D Displays, 3D games, 3D glasses, or any visual immersion application needing an enhancement of depth perception and coherence between intended (real or designed) and displayed 3D scenes.

Adapting equation to a non-planar screen rendering the model can be applied to curved surface displays.

[Specific Aspects of Human Vision]

The classical 3D projection model defines a simple, 'standard', 3D observer based on perspective projection. However, this is a first order approximation, and human vision does not have the characteristics of basic perspective projection.

Physiological Parameters of Human Vision

Many parameters are source of differences or deviations with regard to a simple perspective projection model, as follows. These parameters should be taken into account:
Inter-pupillar distance
Convergence
Ocular media index: n'≈4/3
Accommodation
Prescription glasses
Visual system scaling
. . .

All these differences create a deviation of light rays, i.e. a distortion of light ray angles before reaching the retina. The model where the image formed on the retina is angularly homothetic to a perspective projection of the scene is not representing accurately human vision. Here are some effects explained:

Inter-Pupillar Distance

Inter-pupillar distance sets the scale for binocular vision as the above-mentioned formula (1) shows. This is a primary individual factor and its variability is important (5.2 cm to 7.8 cm according to "Computer Graphics Lecture Notes, CSC418/CSCD18/CSC2504, Computer Science Department, University of Toronto, Version: Nov. 24, 2006"). However varying the "e" parameter is often the tool used to lower S3D visualization discomfort or fatigue, and some study (see "Rosenberg, L. B. (1993, September). "The effect of interocular distance upon operator performance using stereoscopic displays to perform virtual depth tasks." In Virtual Reality Annual International Symposium, 1993., 1993 IEEE (pp. 27-32)") even reports that an "e" value as small as 3 cm (while average is ~6.3 cm) does not affect operator performance in a virtual reality task. This shows that humans have a wide range of acceptability for S3D even if strongly physically inappropriate "e" values are used. Acceptability is however masking 3D perception concerns.

Convergence

The eyes converge when presented a proximal stimulus, depending on visual attention (see "Q. Huynh-Thu, M. Barkowsky, P. Le Callet, "The importance of visual attention in improving the 3D-TV viewing experience," IEEE Trans. Broadcasting, vol. 57, no. 2, pp. 421-430, June 2011"). The direction of the visual axis is then modified for each of the eyes when converging. A first effect is the change of retinal disparities compared to a situation where the two fixation axes would remain parallel (angular shift of each view according to convergence). Every disparity presented to the viewers has to be reassessed according to their convergence state. A second effect of convergence is reducing inter-pupillar distance as the pupils get closer when the eyes rotate to converge. The effect of eye point location is analyzed in "Vaissie, L., Rolland, J. P., & Bochenek, G. M. (1999, May). Analysis of eyepoint locations and accuracy of rendered depth in binocular head-mounted displays. In Conference on Stereoscopic Displays and Applications X, Proc. SPIE (Vol. 3639, p. 57)". As well convergence modifies the optical axis orientation for each of eyes. As these axes are reference (symmetry) axes for optical transforms of the eye, convergence impacts the way images presented on a screen are mapped onto the retinas. Convergence micropsia can be consciously perceived particularly for strong negative disparities/strong convergence but shall be as well present at a lesser degree for lower convergence levels.

Ocular Media Index: n'≈4/3

Snell/Descartes law applies when light rays cross the cornea surface. Ocular media have a refractive index n' close to a value of 4/3. This makes the eye a "Thick lens" where projection approximations usually used with thin lenses (central projection thru the optical center) do not apply. A 'single point optical center+symmetric focal points model' has to be replaced at least by a six cardinal points model (i.e., 2 focal points+2 principal points+2 nodal points). Furthermore, as the ocular media refractive index is not close to 1, ray directions inside the eye do not match ray directions of light incident from the scene. From inside the eye, monocular distances to points in the scene appear divided by n'. Binocular perception is modified creating perspective distortion dependent on convergence.

Accommodation

Accommodation modifies the power of the eye by modifying the eye lens curvatures. This affects the ray path to the retina, basically generating a scaling of the projected image (see "Johnston, E. B. "Systematic distortions of shape from stereopsis", Vision Research, 31, 1351-1360 (1991)"). Angular distortion may as well appear when accommodating, the deviation increasing with the angular distance of a scene point to the optical axis. The inventors experienced in a controlled experiment that objects displayed with uncrossed disparities appeared flattened while objects displayed with crossed disparities were perceived elongated in depth. On the basis of perceptual estimation, it is possible to rearrange the disparity map to correct the flattening/elongation distortion (see "C. Vienne P. Mamassian and L. Blonde, "Perception of stereo at different vergence distances: Implications for realism" submitted to the "International Conference on 3D Imaging" (IC3D), December 2012").

Prescription Glasses

Prescription glasses as well modify the ray path between the observed scene and the retina (see "Alonso, J., & Alda, J. (2003). Ophthalmic optics. Encyclopedia of Optical Engineering, 1563-1576"). Up- or down-scaling, depending on the prescription power, as well as distortion, may happen. Another effect is linked to convergence, with a prismatic effect modifying the chief ray of the observed point of interest beam.

Visual System Scaling—Size/Depth Constancy

Non optical scaling has been identified, linked to perceptual constancy and originated in the post-retinal visual system (see "Murray, S. O., Boyaci, H., & Kersten, D. "The representation of perceived angular size in human primary visual cortex". Nature neuroscience, 9 (3), 429-434. (2006)"). Perceptual constancy refers to the fact that our perception of objects are relatively constant despite the fact that the size of objects on the retina vary greatly with distance. It reflects a tendency to perceive stimuli as represented in the environment rather than as represented on the retina. Although the source of this effect is still discussed amongst authors, it affects significantly size and depth perception depending on an estimate of the distance between the observed object and the observer. This estimate of viewing distance is presumably relying on the actual vergence and accommodative states (see "Watt, S. J., Akeley, K., Ernst, M. O., & Banks, M. S. "Focus cues affect perceived depth". Journal of Vision, 5 (10). (2005)" and "Mon-Williams, M., & Tresilian, J. R. "Ordinal depth information from accommodation?". Ergonomics, 43 (3), 391-404. (2000)"), and on the size ratios of horizontal and vertical disparities (see "Rogers, B. J., & Bradshaw, M. F. "Disparity scaling and the perception of frontoparallel surfaces". Perception-London, 24 (1), 155-180. (1995)"), with distance dependence.

Figure 5:
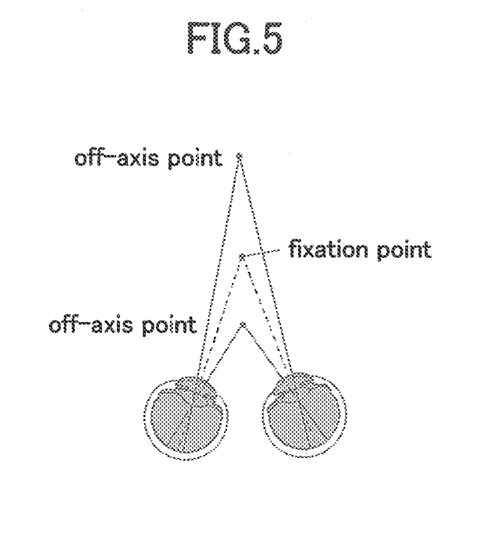
FIG. 5 illustrates on-axis (fixation) point and off-axis points.

Off-Axis Vision:

While a number of physiological parameters of human vision have thus been described, here is explored the aspect of off-axis vision with the prospect that it participates strongly to the feeling of immersion, when a rendered scene corresponds correctly to reality in the non-axial field of view. Indeed, when the two eyes converge at a fixation point (see FIG. 5), there is a range of disparities, known as Panum's fusional area where the two images, one for each of eyes, generate the percept of a single object, appearing with perceived depth. Outside this area, observers experience diplopia (double images), leading sometimes to binocular rivalry, or more often to binocular suppression (see "Howard, I. P., & Rogers, B. J. (1995). Binocular vision and stereopsis. Oxford University Press, USA"). As of today, when observing a scene on a 3D screen, it can be noticed that only a restricted field of view generates depth perception. Above some degrees away from the fixation point depth is no more perceived and lateral parts of the scene look flat. If gaze orientation changes towards them, these regions will be seen with depth, as becoming the 'on-axis' regions. On the other hand, in natural vision, the field of depth perception is larger, corresponding to an acquired capacity of the visual system to perceive depth at larger field angles. This capacity is modified, for example when wearing glasses with a modified prescription or when switching between prescription glasses and contact lenses. It takes some time for the visual system to re-adapt to a new angular projection of the surrounding world on the retinas. Fusion between the left eye view and the right eye view has to be reorganized, which is possible thanks to brain plastic capacities (plasticity).

While the classical 3D model considers only one point in space (or i.e. one pixel, a fraction of degree) and the two pupil centers to compute disparities to be displayed, binocular perception exists in a much wider field of view as the angle subtended by the foveola of each of eyes is about 1 degree and the angle for the fovea is about 6 degrees, this without considering parafoveal perception, also capable of binocular fusion although with less precision. The goal of an extended 3D projection model according to the present embodiment is to widen, to enlarge, the field of view where depth is perceived.

Figure 6A:
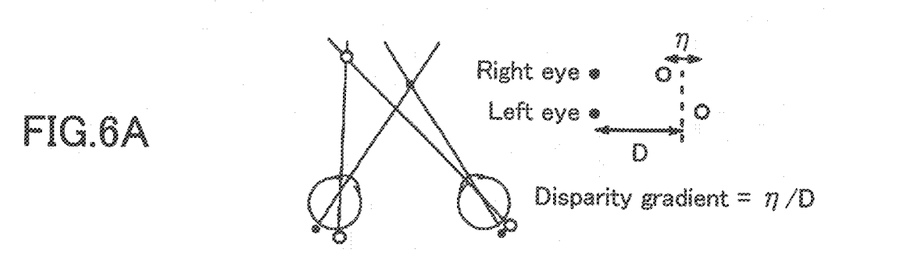
FIGS. 6A, 6B and 6C illustrate disparity gradients.
Figure 6B:
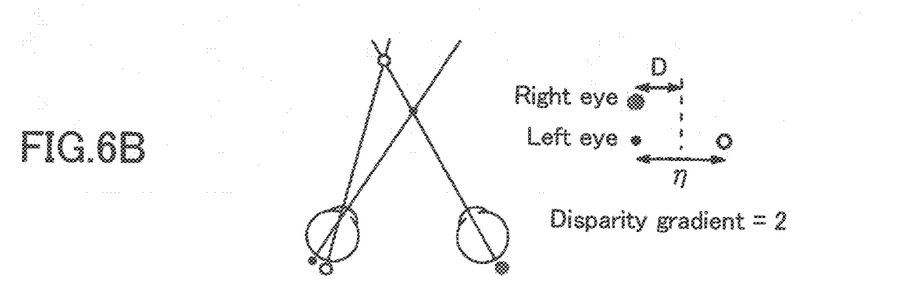
Figure 6C:
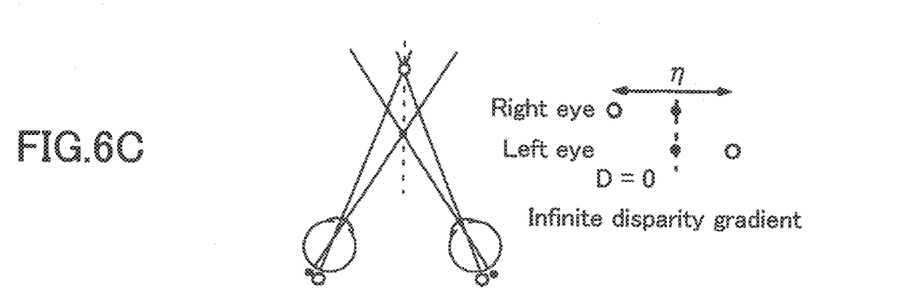

FIGS. 6A, 6B and 6C (from FIG. 2.7 of "Howard, I. P., & Rogers, B. J. (1995). Binocular vision and stereopsis. Oxford University Press, USA") present the notion of disparity gradient G as being the relative angular disparity $\eta$ between the images of two objects divided by their angular separation D: $G=\eta/D$. The authors report that "two dichoptic (viewing a separate and independent field by each of eyes, in binocular vision, as for example in a haploscope, or more generally a stereoscopic display) images do not fuse when the disparity gradient with respect to a neighboring fused pair of images exceeds a value of about 1". FIG. 6A shows a state of two objects with a disparity gradient of less than 2; FIG. 6B shows a state where two objects on a visual line of one eye have a disparity gradient of 2 (the visual line may, or may not, be a visual axis); and FIG. 6C shows a state where two objects on a hyperbola of Hillebrand have a disparity gradient approaching infinity. The disparity gradient is the angular disparity, $\eta$, between the images of two objects divided by their angular separation D. The separation is the angle between the mean direction of the images of one object and the mean direction of the images of the other object. In this case, one object is a fixated black dot and the other object is a circle producing disparity, $\eta$, and with a mean direction indicated by vertical dotted lines.

Considering again a perspective projection model in the 'standard' 3D observer model, it is used independently for the projection of each point in space, considering in each case an on-axis observation for each of eyes. This model does not consider a neighborhood of points, with disparity gradients, that are simultaneously seen by a larger field on the retina, including off-axis regions. In this case, when the field angle increases, the limit on disparity gradient can be broken and depth perception disappears. In that case, non-linearities in the human eye projection need to be taken into account for rendering correctly the 3D stimuli or adapting 3D views.

In other words, while a simple projection model may be valid for on-axis projection (paraxial or Gaussian approximation); off-axis points, in natural viewing, are likely not seen in the directions predicted by a double perspective projection model. These off-axis points will be presented in a 'transformed' direction for each of eyes, so that the 3D stimuli presented to the observer corresponds to his/her natural vision. This process is observer dependent, according to the parameters described above.

Figure 7:
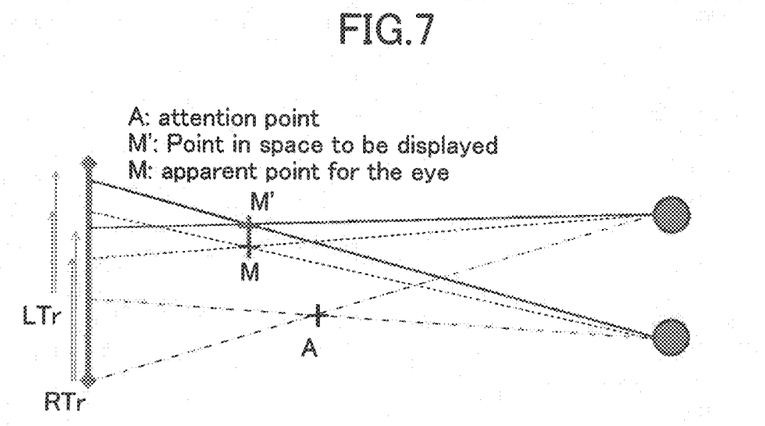
FIG. 7 illustrates internal optical system deviations/scaling.

As shown in FIG. 7, an internal optical system deviation/scaling will be taken into account. Thus, the 3D stimuli will be transformed to present a point M' to generate a perceived point M, correctly fused and at the right spatial location. In fact, when attention is on the point A, the directions from the point M are difficult to or impossible to fuse while the directions from the point M' are correctly fused. In FIG. 7, Ltr denotes left eye transform while Rtr denotes right eye transform.

Based on the above description, according to the present embodiment, a spatial (angular domain) transform is applied to a 3D presented content, dependent on the fixation point and centered on the visual axes, in order to take into account the various optical and non-optical effects in human vision with the goal to enlarge the field of fused 3D.

As mentioned above, the process in the model according to the present embodiment starts from the identification that 3D perception is based first on monocular retinal images. For each individual observer, binocular fusion is trained/adapted to his/her daily life environment. The left and right monocular images, in order to be fused comfortably to create a 3D percept, have to respect, or be closer to, the geometry of natural life observation, for both still scenes and scenes in motion.

The process of the model according to the present embodiment has the goal to transform stereoscopic views initially created for a 'standard' 3D observer as mentioned above.

It is noted that another model, based on the same principles, can be derived for a CGI pipeline in the form of a transformed camera model.

As described above using FIG. 3, the process of the model according to the present embodiment is the independent processing of the left and right views having the goal to re-align pixel directions for each of eyes, starting from 'standard' 3D observer images. After a first step adjusting disparity for the fixation point to be at the intended distance, each view (left and right) is independently processed correcting first a potential keystoning (and astigmatism) before applying a radial transform. Basically, the radial transform is a central scaling (centered on the visual axis) while higher order coefficients represent optical distortions.

Next, a device 100 for 3D rendering according to the present embodiment will be described.

Figure 8:
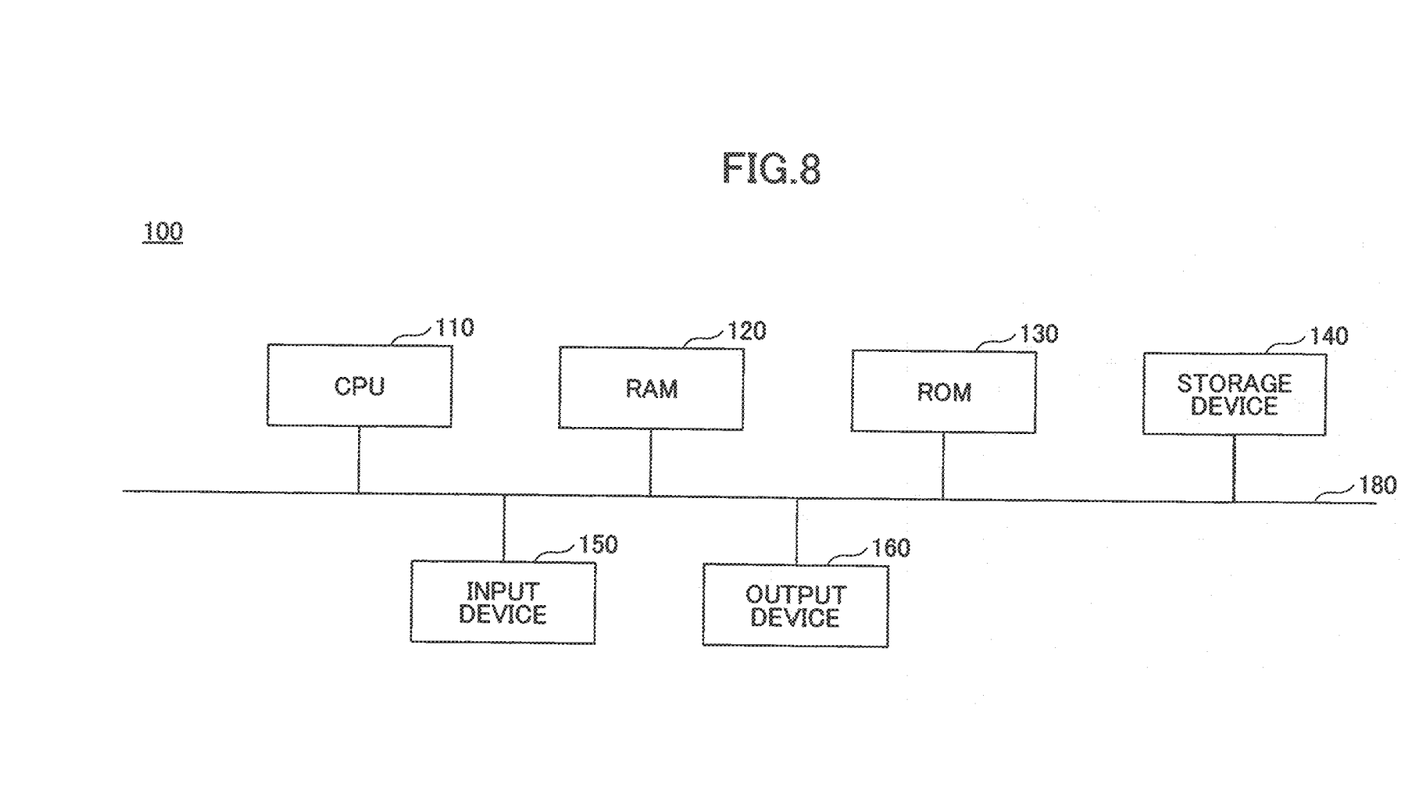
FIG. 8 illustrates one example of a hardware configuration of a device for 3D rendering according to the embodiment of the present disclosure.

As shown in FIG. 8, the device 100 for 3D rendering according to the present embodiment includes a Central Processing Unit (CPU) 110, a Random Access Memory (RAM) 120, a Read-Only Memory (ROM) 130, a storage device 140, an input device 150 and an output device 160 which are connected via a bus 180 in such a manner that they can carry out communication thereamong.

The CPU 110 controls the entirety of the device 100 by executing a program loaded in the RAM 120. The CPU 110 also performs various functions by executing a program(s) (or an application(s)) loaded in the RAM 120.

The RAM 120 stores various sorts of data and/or a program(s).

The ROM 130 also stores various sorts of data and/or a program(s).

The storage device 140, such as a hard disk drive, a SD card, a USB memory and so forth, also stores various sorts of data and/or a program(s).

The input device 150 includes a keyboard, a mouse and/or the like for a user of the device 100 to input data and/or instructions to the device 100.

The output device 160 includes a display device or the like for showing information such as a processed result to the user of the device 100.

The device 100 performs 3D rendering described above using FIG. 3, or so, as a result of the CPU 110 executing instructions written in a program(s) loaded in the RAM 120, the program(s) being read out from the ROM 130 or the storage device 140 and loaded in the RAM 120.

[Example of Transform Taking Into Account Eye Parameters and Accommodative Scaling]

Next, an example of transform taking into account eye parameters and accommodative scaling will be described.

First, n' is defined as an eye refractive index average or approximation (actual eye, or average eye model).

Definition of the model parameters are as follows:

n'=4/3
$f_0$=50/3 (=16.666 . . . mm default)
$N_0N'_0$=$P_0P'_0$(=0.3 mm default)
L, R: eyes position in space
A=Attention point position in space
Kappa angle: angle between visual and optical axes
Screen geometric characteristics
Scene points in space are input.
3D or multiview images on the screen are output.

Figure 9A:
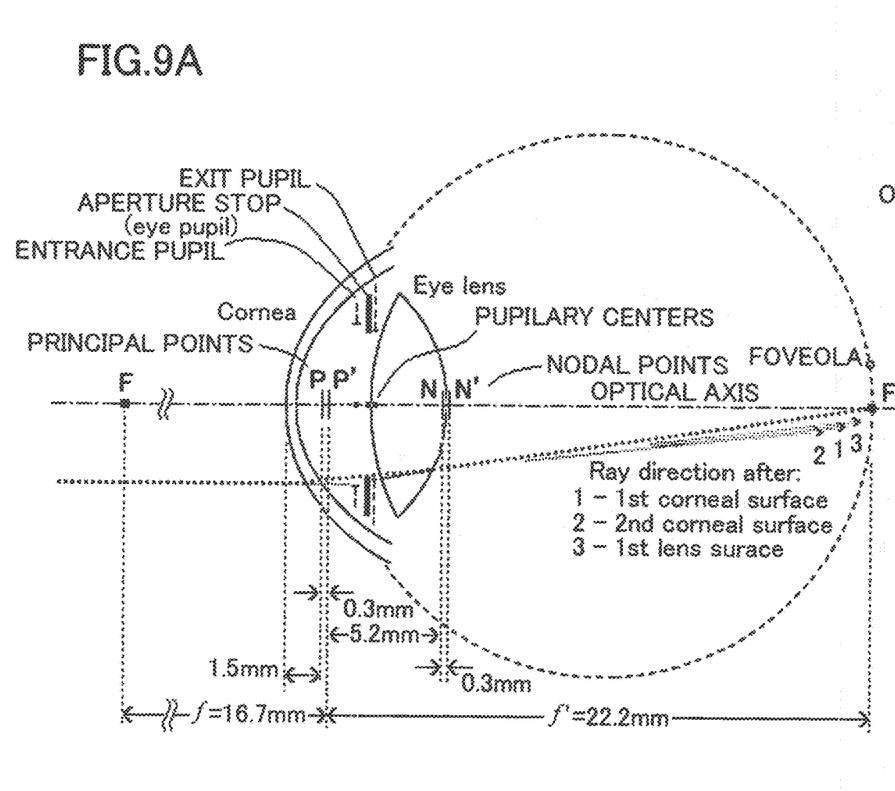
FIG. 9A illustrates a human eye optical system (schematic eye)
Figure 9B:
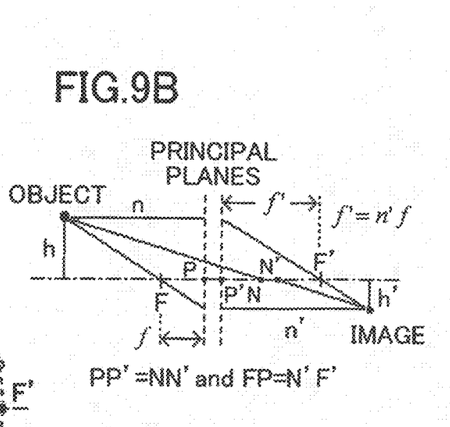
FIG. 9B illustrates image formation based on the schematic eye of FIG. 9A.
Figure 9C:
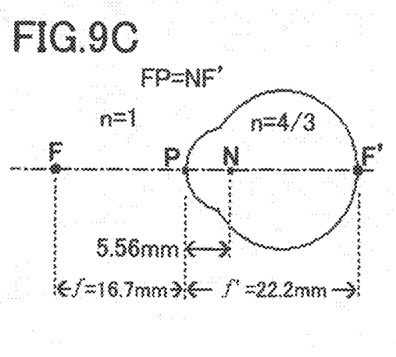
FIG. 9C illustrates a reduced eye based on the schematic eye of FIG. 9A.

The above-mentioned six cardinal points eye model (unequifocal system) is illustrated in FIGS. 9A, 9B and 9C (according to "http://www.telescopeoptics.net/eye_aberrations.htm").

The schematic human eye of FIG. 9A shows average values for the six cardinal points eye model.

As shown in FIG. 9B, image formation is such that an image of a point "object" at the height h in the outer field is determined by two rays originating at the object point, one normal to the 2nd principal plane (normal to the axis at the 2nd principal point P'), and the other passing through the anterior focal point and turning parallel with the axis at the first principal plane (normal to the axis at the first principal point P). The significance of nodal points is that the ray from object point directed toward 1st nodal point (N) acts as if it follows the axis to the 2nd nodal point (N'), from which it connects to the image point keeping the original ray orientation. In other words, nodal points define the actual incident angle, i.e. actual field of view. The apparent incident angle, and field of view, determined by the ray passing through the center of exit pupil (i.e. intersecting the axis at a point between nodal and principal points)—the chief ray—is smaller than the actual angle and field; for the schematic eye, by a constant factor of about 0.82.

As shown in FIG. 9C, the "reduced eye" is a simple representation of the eye as a unequifocal system (different focal length in the object and image spaces due to a different refractive index).

An observing position is defined by a viewing eye position in space. It can be a left or right eye in stereoscopy, or a position determined by one of the multiple views of an autostereoscopic display.

For each view, the following processes (1), (2), (3) and (4) are carried out:

(1) From the attention point A position in space and an observing position $O_P$ in space, a Visual axis $D_V$ in space, the line passing through A and $O_P$ are determined.

(2) If the Optical axis is not approximated to the Visual axis $D_V$, an Optical axis $D_O$ in space is determined (using Kappa angle).

(3) From the attention point A position in space, an accommodative focal distance f depending on an initial focal distance $f_0$ and of distance $PA_P$ (=$f_{acc}$ the focal length of a complementary lens corresponding to accommodation) is computed, where P is principal point of the eye model and $A_P$ is the orthogonal projection of A on the Optical axis $D_O$.

The thin lens formula $$\frac{1}{f_{acc}} = \frac{1}{f_0} - \frac{1}{f} = \frac{1}{PA_P}$$

gives $$f = 1 / \left( \frac{1}{f_0} - \frac{1}{PA_P} \right).$$

(4) From f and $f_0$, a magnification factor m=$f_0$/f is computed.

For each scene point M in space (in absolute scene coordinates), the following process is carried out:

an Intended direction $D_I$ is determined for each scene point M considering the Observing position N' nodal point (N' is obtained by translating N on Optical axis $D_O$ by an observer dependent NN' distance);

knowing the Optical axis $D_O$, the Observing position N' nodal point position, and Intended direction $D_I$, a Required direction $D_R$ passing through eye N nodal point position is computed;

a (L or R) image point $I_M$ as being the intersection of the Required direction $D_R$ and the (L or R) imaging plane is determined; and to obtain a final projected point $I_M$, the magnification factor 1/m is applied to the image point $J_M$ in the (L or R) imaging plane, respective to the centre of the magnification $I_O$, where $I_O$, is the intersection of the imaging plane and the Optical axis $$D_O \left( \overline{I_O I_M} = \frac{\overline{I_O J_M}}{m} \right).$$

For stereo, the process is repeated for the left and right view independently. For multiple view displays, the process can be repeated for each view independently.

For stereoscopy, the scene can then be observed binocularly, the left eye being presented the left image and the right eye being presented the right image.

Similarly, for autostereoscopy, the scene can then be observed binocularly from the screen sweet spot point of views.

Note that the specific example described above as [Example of transform taking into account eye parameters and accommodative scaling] relates to the process described above using the flowchart of FIG. 3 and concerns the derivation of the scaling factor in "Transform centered on <<C>>" (Steps S6-S8) of FIG. 3. The scaling factor (magnification factor) is $m=f_0/f$ and the center of magnification $I_0$ is the same point as the point <<C>> in FIG. 3.

The derivation of "m" in this example is only an example based on the use of the six cardinal points eye model described above. Influence of corrective glasses magnification is not taken into account here.

Thus, the device, method and program for 3D rendering have been described in the specific embodiment. However, the present disclosure is not limited to the embodiment, and variations and replacements can be made within the scope of the claimed disclosure.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

The invention claimed is:

1. A method of rendering a 3D scene on an imaging plane for a viewer using a 3D rendering device configured render a stereo pair, the method comprising:

determining a first intersection point of a fixation axis of a left eye with an imaging plane, carrying out a first keystone transform of a left view to a plane orthogonal to the fixation axis of said left eye resulting in a keystone transformed left view, carrying out a radial transform of said keystone transformed left view with said first intersection point as a center resulting in a radial transformed left view, and carrying out an inverse keystone transform of said radial transformed left view resulting in a processed left view, wherein said inverse keystone transform is defined as the inverse of said first keystone transform, determining a second intersection point of the fixation axis of right eye with the imaging plane carrying out a second keystone transform of a right view in a plane orthogonal to the fixation axis of said right eye resulting in a keystone transformed right view, carrying out a radial transform of said keystone transformed right view with said second intersection point as a center resulting in a radial transformed right view, carrying out an inverse keystone transform of said radial transformed right view resulting in a processed right view, wherein said inverse keystone transform is defined as the inverse of said second keystone transform, wherein keystone and radial transforms are performed utilizing interpolated parameters, said interpolated parameters being an interpolation between parameters estimated for a plurality of points in a 3D space, and rendering said stereo pair comprising said processed left view and said processed right view.

2. Method according to claim 1, wherein the radial transform for the left eye is performed based on at least one left eye radial scale factor $sL1, sL2, sL3, sLn$ of different orders applied to a radial distances "rL" to said first intersection point on the said plane orthogonal to the fixation axis of said left eye, such that the transforming radial distance $rL'=sL1 \cdot rL+sL2 \cdot (rL)2+sL3 \cdot (rL)3+sLn \cdot (rL)n$, and wherein the radial transform for the right eye is performed based on at least one right eye radial scale factor $sR1, sR2, sR3, sRn$ of different orders applied to a radial distances "rR" to said second intersection point on the said plane orthogonal to the fixation axis of said right eye, such that the transforming radial distance $rR'=sR1 \cdot rR+sR2 \cdot (rR)2+sR3 \cdot (rR)3+sRn \cdot (rR)n$.

3. Method according to claim 2, wherein respective the radial scale factors of the left eye and right eye are determined by an interactive process by the observer, wherein the interactive process comprising scaling a rendered shape horizontally and vertically by comparing the rendered shape with a shape of a physical object placed at an intended fixation point.

4. Method according to claim 2, wherein said at least one left eye radial scale factors $sL1, sL2, sL3, sLn$ and said at least one right eye radial scale factor $sR1, sR2, sR3, sRn$ are dependent on said observer's physiological parameters respectively for his/her left eye and for his/her right eye.

5. Method according to claim 4, wherein said observer's physiological parameters comprise at least one of Interpupillar distance, Convergence, Ocular media index, Accommodation, Prescription glasses, and Visual system scaling of said observer.

6. A device for 3D rendering a 3D scene for a viewer, the device comprising a memory associated with at least one processor configured for:
- determining a first intersection point of a fixation axis of a left eye with an imaging plane,
- carrying out a first keystone transform of a left view to a plane orthogonal to the fixation axis of said left eye resulting in a keystone transformed left view,
- carrying out a radial transform of said keystone transformed left view with said first intersection point as a center resulting in a radial transformed left view,
- carrying out an inverse keystone transform of said radial transformed left view resulting in a processed left view, wherein said inverse keystone transform is defined as the inverse of said first keystone transform,
- determining a second intersection point of the fixation axis of right eye with the imaging plane,
- carrying out a second keystone transform of a right view in a plane orthogonal to the fixation axis of said right eye resulting in a keystone transformed right view,
- carrying out a radial transform of said keystone transformed right view with said second intersection point as a center resulting in a radial transformed right view, and
- carrying out an inverse keystone transform of said radial transformed right view resulting in a processed right view, wherein said inverse keystone transform is defined as the inverse of said second keystone transform,
- wherein keystone and radial transforms are performed utilizing interpolated parameters, said interpolated parameters being an interpolation between parameters estimated for a plurality of points in a 3D space, and
- rendering said stereo pair comprising said processed left view and said processed right view.

7. Device according to claim 6, wherein the radial transform for the left eye is performed based on at least one left eye radial scale factor sL1, sL2, sL3, sLn of different orders applied to a radial distances "rL" to said first intersection point on the said plane orthogonal to the fixation axis of said left eye, such that the transforming radial distance $rL'=sL1·rL+sL2·(rL)2+sL3·(rL)3+sLn·(rL)n$, and wherein the radial transform for the right eye is performed based on at least one right eye radial scale factor sR1, sR2, sR3, sRn of different orders applied to a radial distances "rR" to said second intersection point on the said plane orthogonal to the fixation axis of said right eye, such that the transforming radial distance $rR'=sR1·rR+sR2·(rR)2+sR3·(rR)3+sRn·(rR)n$.

8. Device according to claim 7, wherein respective the radial scale factors of the left eye and right eye are determined by an interactive process by an observer, wherein the interactive process comprising scaling a rendered shape horizontally and vertically by comparing the rendered shape with a shape of physical object.

9. Device according to claim 6, wherein said at least one left eye radial scale factors sL1, sL2, sL3, sLn and said at least one right eye radial scale factor sR1, sR2, sR3, sRn are dependent on the observer's physiological parameters respectively for his/her left eye and for his/her right eye.

10. Device according to claim 9, wherein said observer's physiological parameters comprise at least one of Interpupillar distance, Convergence, Ocular media index, Accommodation, Prescription glasses, and Visual system scaling of said observer.

11. Computer program product downloadable from a communication network or recorded on a medium readable by computer and executable by a processor, comprising program code instructions for implementing the steps of a method according to claim 1.

12. Non-transitory computer-readable medium comprising a computer program product recorded thereon and capable of being run by a processor, including program code instructions for implementing the steps of a method according to claim 1.

* * * * *